M. H. MANDELBAUM & G. F. MAISCH.
CURRENCY SELECTOR.
APPLICATION FILED DEC. 10, 1914.

1,233,491.

Patented July 17, 1917.
6 SHEETS—SHEET 1.

M. H. MANDELBAUM & G. F. MAISCH.
CURRENCY SELECTOR.
APPLICATION FILED DEC. 10, 1914.

1,233,491.

Patented July 17, 1917.
6 SHEETS—SHEET 6.

Witnesses:

Inventor
Maurice H Mandelbaum
Gustave F Maisch

UNITED STATES PATENT OFFICE.

MAURICE H. MANDELBAUM AND GUSTAVE F. MAISCH, OF CHICAGO, ILLINOIS; SAID MAISCH ASSIGNOR TO SAID MANDELBAUM.

CURRENCY-SELECTOR.

1,233,491. Specification of Letters Patent. Patented July 17, 1917.

Application filed December 10, 1914. Serial No. 876,456.

*To all whom it may concern:*

Be it known that we, MAURICE H. MANDELBAUM and GUSTAVE F. MAISCH, both citizens of the United States, and residents of Chicago, in the county of Cook and State of Illinois, have invented certain new and useful Improvements in a Currency-Selector, of which the following is a specification.

Our invention relates to computing machines and has particular reference to an improvement on the construction shown in our co-pending application, Serial No. 806,185, filed December 12, 1913.

Generally stated the present device as well as that shown in our prior application referred to is intended for use in selecting the required number of currency units which will be necessary in order to equal a given total. Such a device is particularly useful in making up pay rolls where the actual currency is to be delivered. In making up a large pay roll, especially where the amounts payable to each employee are uneven or unequal, it is laborious to attempt to determine the required number of currency units to equal the total amount. A machine such as here disclosed is capable of performing this work in a rapid and accurate manner.

The present device differs from that disclosed in our prior application in the provision of positive locking means so arranged as to eliminate the possibility of mechanical errors, this locking means including a key which may be manually operated and if desired removed from the machine. When so removed from the machine the accumulator or registering mechanism is inactive or inoperative.

The principles of the mechanism are capable of general application, many thereof being applicable to all sorts of computing machines, the present association thereof with a currency selector being for the purpose of illustration only.

The invention will be more readily understood by reference to the accompanying drawings, wherein

Fig. 13$^a$ is a longitudinal vertical sectional view through a plurality of keys and locking devices such as shown in Fig. 13.

Figure 1:
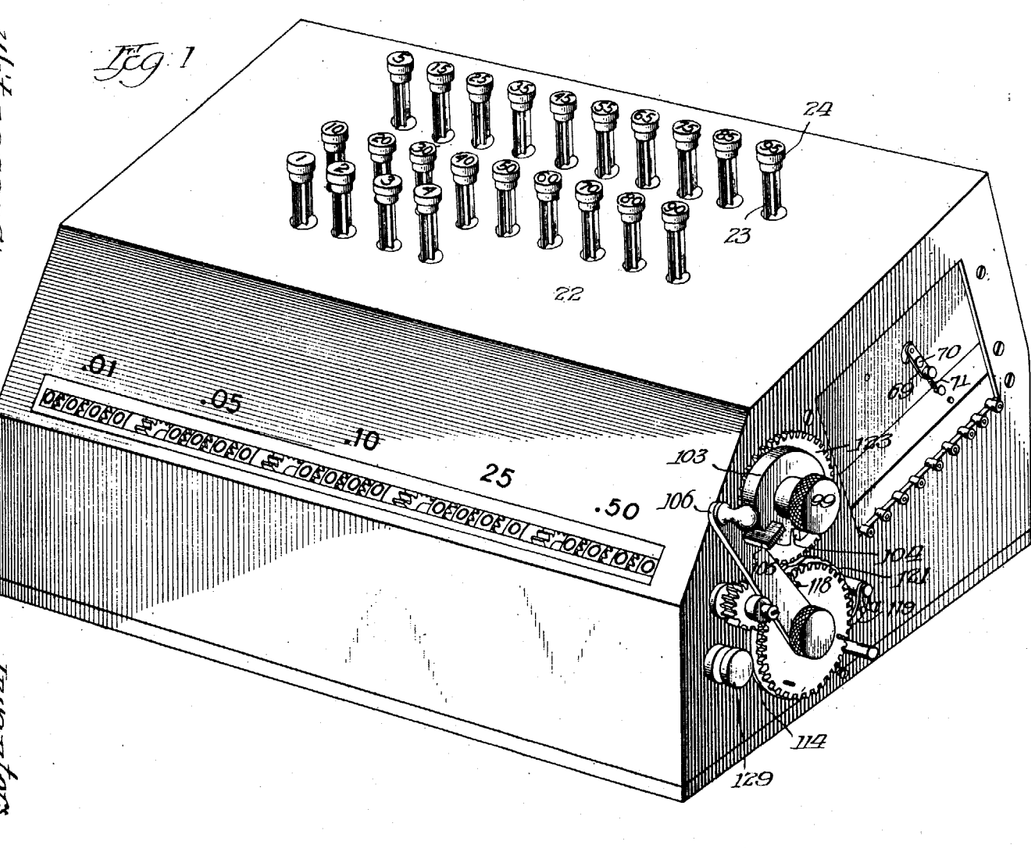
Figure 1 is a perspective view of a machine such as contemplated by us.
Figure 5:
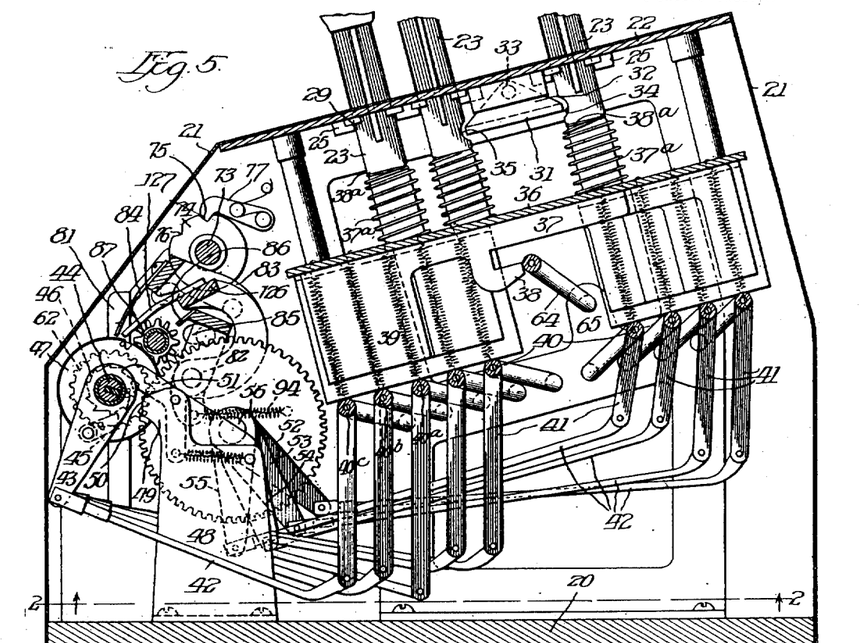
Fig. 5 is a transverse vertical section on the line 5—5 of Fig. 7.
Figures 6, 13, 14:
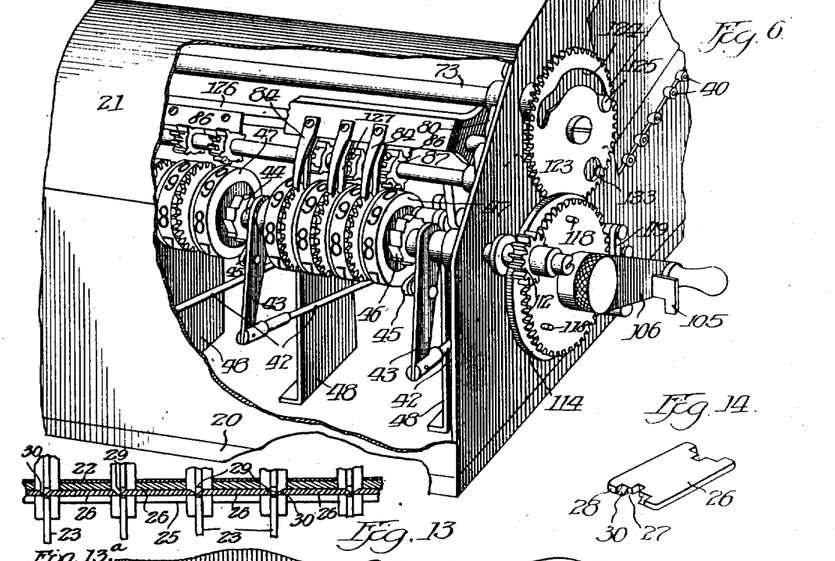
Fig. 6 is a perspective view with a portion of the casing broken away to show the number wheels and the overthrow-preventing means.
Fig. 13 is a bottom plan partly in section of the plate through which the keys project, showing the locking means therefor.
Fig. 14 is a perspective view of one of the plates located between adjacent keys and acting to lock all the keys in a single row.
Figure 7:
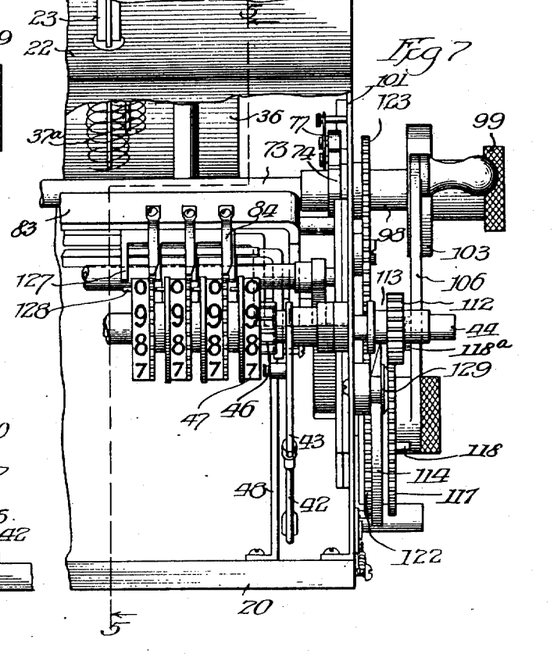
Fig. 7 is a front elevation of the construction shown in Fig. 6.
Figure 8:
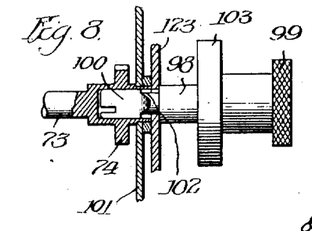
Fig. 8 is an enlarged fragmentary detail of the locking key and its relation to the parts engaged thereby.

Referring more particularly to the drawings it will be seen that we provide a base 20 to which an inclosing casing 21 is fixed. Through the top plate 22 of the casing are projected the plungers 23 surmounted by buttons or keys 24. As shown in Figs. 1, 5, and 13, the standards or plungers 23 are substantially cruciform in cross section at the point of coöperation with the plate 22 and fit within similarly shaped openings in said plate. Beneath the plate 22 are mounted strips 25, one on each side of each row of keys. These strips have undercut edges and serve to support locking plates 26, best shown in Fig. 14, one of said plates being located between each pair of keys. The ends of the plates 26 are notched, as at 27, to fit the plungers 23. The ends 28 of the plates extend past the edges of the plungers and cooperating with notches 29 formed in the edges of the standards 23, the ends 28 of adjacent plates being substantially in engagement throughout the entire row of keys. The portion 30 of the plates 26 are beveled at the point of engagement of the plates with the notches in the plungers and therefore when one key of a row is depressed all the plates 26 within the row are moved and the plates brought into engagement with the notches 29 in the plungers. Thus only one key in a row may be actuated simultaneously.

As a means for locking adjacent rows of keys we may provide the locking mechanism best shown in Figs. 5 and 13. This consists in a plate 31 having triangular end portions 32 which are bent upward and pivoted as at 33 to the plate 22. This locking member is mounted for free oscillation, its edges lying in the plane of notches 34, 35, formed in the plungers of adjacent rows. It will be seen on reference to Fig. 5, that when one key plunger 23 is depressed the plate 31 will be caused to swing, the opposite edge of the plate entering the notch in the adjacent row of keys thus preventing any key in that row from being actuated.

Figure 2:
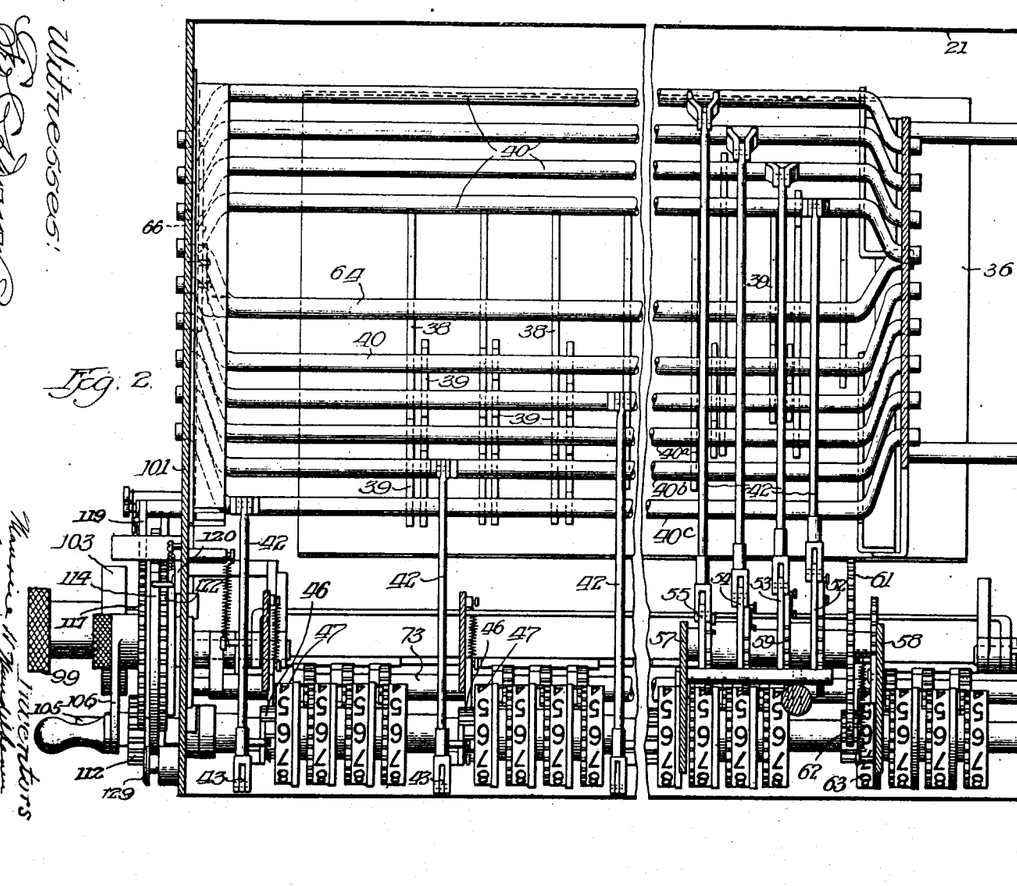
Fig. 2 is a bottom plan view with portions of the casing and frame in section.

The plungers 23 also project through an intermediate plate 36, a coil spring 37ª resting at its lower end on said plate, the upper end of the spring being secured to the plungers at 38ª. The keys are thus normally held in elevated position. The lower end of the plungers 23 vary somewhat in configuration, but each thereof is provided with a right angular extension 37 and a hook 38. The extensions 37 at their ends terminate in a downwardly projecting lug 39 which lies above one or more rockers 40. This is shown in Figs. 2 and 5. In Fig. 5 the portion 39 lies above three rockers 40ª, 40ᵇ, 40ᶜ, representing respectively the rockers which actuate the counters for the fifty cent, twenty-five cent, and ten cent denominations. Other keys engage one, two or more rockers as required in order to register the necessary units. Rigidly secured to each of the rockers 40, 40ª, etc., are arms 41, these arms being of different lengths according to the degree of throw or movement required to actuate the counting mechanism. Connected to the lower ends of each of the arms 41 are links 42 which links are in turn connected to arms 43 loosely mounted on the transverse number wheel shafts 44. A pawl 45, shown in dotted lines in Fig. 5, and in full lines in Fig. 6, is pivoted to the arm 43 and engages a ratchet 46 likewise loosely mounted on shaft 44 but fixed to the first number wheel 47 of the accumulator mechanism. Referring now particularly to Fig. 5, it will be seen that we provide a bracket 48 fixed to the base 20, one such bracket being provided for each accumulator mechanism. Projecting from the upper portion of this bracket is an extension 49 having an abutment 50 which abutment serves as a stop for the pawl 45. At the completion of the stroke which results in the actuation of the number wheel the pawl 45 is held securely between the abutment 50 and the ratchet 46 and prevents any possible overthrow of the number wheel. Likewise pivoted to the extension 49 of the bracket is a pawl 51 also engaging the ratchet 46, which serves normally as a retaining dog to prevent spinning of the number wheel.

Figure 9:
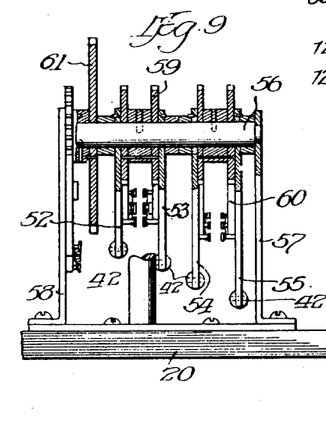
Fig. 9 is a sectional view of the means employed for securing the actuation of a single accumulator mechanism by a plurality of keys.

In some instances it is necessary that several keys should be connected to the same accumulator mechanism. One instance of this is shown in Figs. 2 and 9 wherein the arms 52, 53, 54, 55, corresponding to the arms 43, are mounted on the shaft 56, which shaft is supported in a pair of brackets 57, 58, mounted on the base 20. Likewise mounted and secured against rotation on the shaft 56 are ratchets 59, one for each arm 52 to 55 inclusive. A pawl 60 mounted on each arm engages the ratchets and tends to rotate the ratchets in one direction to an extent corresponding to the throw of the arms 52 and 55 under the influence of the actuating keys. Also fixed to shaft 56 is a gear 61 meshing with a pinion 62 fixed to a number wheel 63. The arrangement is such that the arm 52 causes a movement of the number wheel 63 through four notches; the arm 53 moves the number wheel three notches; the arm 54 moves the wheel two notches, and the arm 55 one notch.

Figure 4:
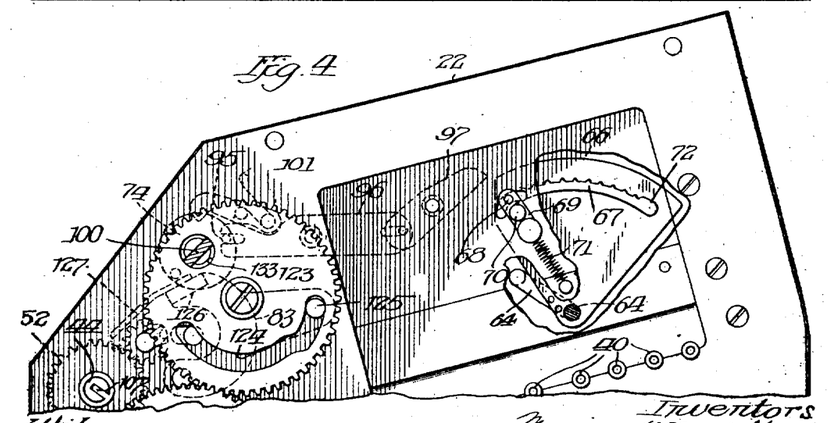
Fig. 4 is a view similar to Fig. 3 and showing in dotted lines some parts which would not show to advantage in Fig. 3.

As heretofore stated each key is provided with a hook portion 38 which portion, as best shown in Fig. 5, normally lies outside the plane of a rocker 64 mounted in brackets 65 carried by the frame of the machine at each end thereof. As shown the rocker 64 normally rests in an inclined position and as the key descends the portion 37 thereof rotates the rocker 64 bringing the horizontal bar thereof into the plane of the hook 38. At one end of the rocker a segment 66 is secured thereto, this segment being provided with an arcuate slot 67, as best shown in Fig. 4. One edge of the slot is notched or toothed, the teeth being engaged by a pin 68, carried by a two-way pawl 69 pivoted at 70 to the casing 21. A spring 71 tends to maintain the pawl in the position shown in Fig. 4. However, when a key is actuated the segment 66 is moved to the left, as viewed in Fig. 4, and the pin 68 engages the teeth formed in the slot in the segment 66. The segment and likewise the key cannot be returned to normal position until the segment has traveled to the full extent of its stroke and the pin 68 occupies the space 72 therein whereupon the segment may freely return, the pawl acting oppositely to that just described and compelling a complete return movement of the key.

The parts heretofore described relate wholly to the registering or accumulating mechanism and the means employed for preventing overthrow and requiring a full stroke of the keys. We will now describe the means employed for canceling the amounts set up on the number wheel and the means for disengaging the registering mechanism therefrom and locking the same against actuation during the canceling operation.

As best shown in Figs. 3, 4, 7, 8, 11 and 12, we provide a transverse shaft 73 mounted in suitable bearings in the frame, this shaft carrying on each end a wheel 74 having notches 75, 76 in the periphery thereof, these notches being engaged successively by a pawl 77 which serves to hold the shaft against accidental movement. Carried by each wheel 74 is a pin 78 engaging a notch 79 in a sliding plate 80, this plate being mounted for reciprocation between guides 81, best shown in Figs. 11 and 12. Cam slots are provided within the plate 80, these slots serving to actuate various bars or shafts as follows:

Mounted on a shaft 82 as a center is a rocker 83 to which a plurality of spring fingers 84 are secured, these fingers normally lying above the number wheel gears and out of engagement therewith. The movement of the plate 80 brings these fingers down into engagement with the number wheels and loosely holds them against movement. Also pivoted to shaft 82 is a rocker 85 carrying a bar 86 thereon, which bar, on movement of the plate 80, is adapted to engage the Geneva gears 87 and positively hold the same against accidental movement. The rocker 83 is moved by the plate 80 by engaging with a stub shaft 88 engaging the cam slot 89, and the rocker 85 is moved by the stub shaft 90 engaging the cam slot 91 in the plate.

The Geneva gears are mounted upon a shaft and this shaft is bodily movable into and out of engagement with the number wheels by coöperation of the shaft 92 with the cam slot 93 in the plate 80. Each of the shafts 88, 90, 92 operate in short arcuate slots in the frame outside of the plate 80. It will be noted that the bar 86 was described as positively engaging the Geneva gear. This is true for the following reason; the first movement of the plate 80 causes the release of the rocker 85 and the plate 86 engages the Geneva gears under the action of the spring 94. However, as the movement of the plate 80 continues the Geneva gears are moved rearwardly with the plate 86 still in engagement until at the extremity of movement of the gears the rocker 85 has reached its limit of movement and the engagement with the gears is positive.

As best shown in Fig. 4, the wheel 74, located on the cancellation side of the machine, is provided also with a pin 95 adapted to engage a lever 96 which lever engages the dog 97 normally lying out of the arc of movement of the segment 66. However, during the inception of rotation of the wheel 74 the dog 97 is moved into the arc of rotation of the segment 66 and absolutely prevents rotation thereof and consequently prevents actuation of any key on the board. The means for causing actuation of the shaft 73 may consist in the key 98 having a knurled nut 99 on one portion thereof. In the present instance the key is provided with a flattened end portion 100 adapted to enter a similarly shaped recess within the end of the shaft 73. Likewise the opening through the frame member 101 is of the same shape. At a point inward from the end of the key the shank is reduced in size as at 102. Therefore, when the key has been inserted and the shaft 73 turned the key cannot be removed until its shaft has been returned to its original position. As a means for requiring the insertion of the key in the proper manner we may provide an annular flange 103 thereon having, as shown in Fig. 3, a notch 104 therein, this notch registering when the key is inserted with the lug 105 on the handle 106.

Figure 10:
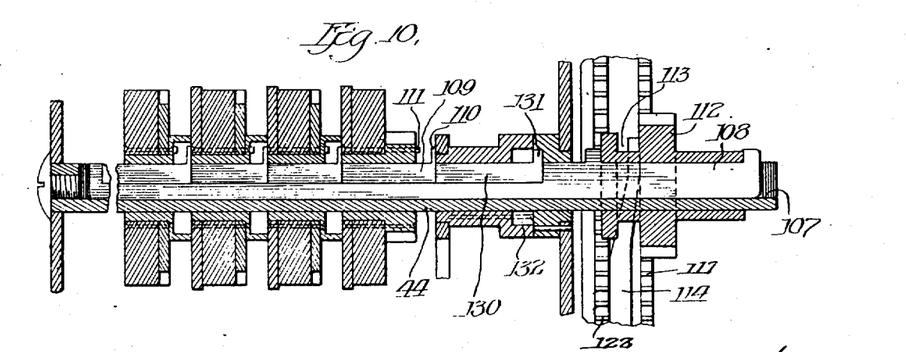
Fig. 10 is an enlarged sectional view of the shaft carrying the accumulator mechanism, showing in detail the means employed for connecting up said accumulator mechanism to the cancellation mechanism.
Figure 11:
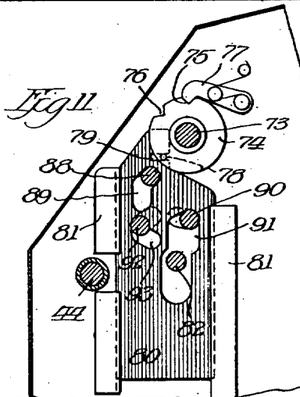
Fig. 11 is a fragmentary detail elevation of the parts which are movable by the locking key to effect the desired result, the view being shown of the parts in position which permits the keys to be actuated and the normal functions of the accumulator mechanism being carried out.
Figure 12:
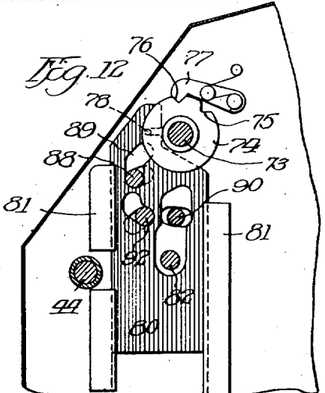
Fig. 12 is a similar view showing the parts in the position which they will assume after the key has been actuated.
Figure 13A:
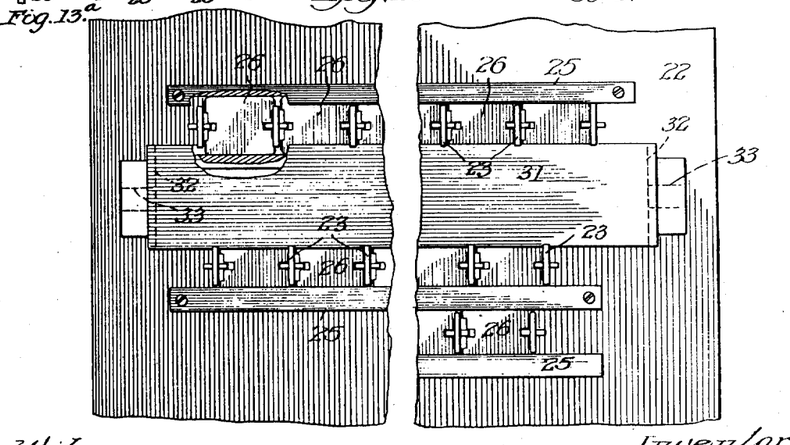

As a means for effecting cancellation we provide the shaft 44, heretofore referred to, having a groove 107 therein. Mounted within the groove 107 is a sliding bar 108, as best shown in Fig. 10, this bar being reduced in size at the point of the number wheels to accommodate separate catches 109, these catches being provided with upwardly projecting pins or studs 110, normally out of engagement with the number wheels but adapted upon sliding movement of the bar 108 to the left as viewed in Fig. 10, to engage pins 111 carried by the number wheels and upon rotation of the shaft 44 to cause rotation of the number wheels. As a means for causing rotation of the shaft 44 and likewise the cancellation of the amounts set up on the number wheels we provide a pinion 112, having an integral collar thereon within which a groove 113 is provided. It will be understood, of course, that the bar 108 and the gear 112 are interlocked and therefore rotate together. The groove 113 accommodates the edge of a cam 114, best shown in Figs. 3, 7 and 10. This cam is mounted on a shaft 115 which is fixed to the frame, the cam being freely rotatable thereon. This cam member 114 is provided with a collar to which the handle 106 is pinned by the two pins 116, best shown in Fig. 3. Meshing with the gear 112 is a larger gear 117 which gear is mounted on the collar which is integral with the cam member, being freely rotatable thereon. On the face of the gear 117 are three equally spaced pins 118 adapted to be engaged by a pawl 118ᵃ mounted on the inside of the handle 106. This pawl is arranged to cause rotation of the gear 117 in a clockwise direction, but has no effect on the gear on the return movement of the handle. As a means for preventing back lash of the gear 117 we provide a pawl 119 engaging the periphery of the gear. The means for requiring a full stroke of the handle, and therefore the cancellation mechanism, comprises the two-way pawl 120 which engages the notched periphery of the cam wheel 114. This full stroke mechanism is similar to that described in connection with the parts 66 to 72. Fixed to the cam 114 is a gear 122, this gear meshing with a similar gear 123, best shown in Figs. 3, 4 and 7. Within this gear we provide a cam groove 124 which engages with a stub shaft 125, this shaft in turn actuating a rocker 126, this rocker carrying fingers 127. On the rotation of the gear 123 the fingers 127 are adapted to be projected into the arc of movement of pins 128 mounted on the number wheels, best shown in Fig. 7. By this means we provide a positive stop preventing overthrow of the number wheels during cancellation.

Figure 3:
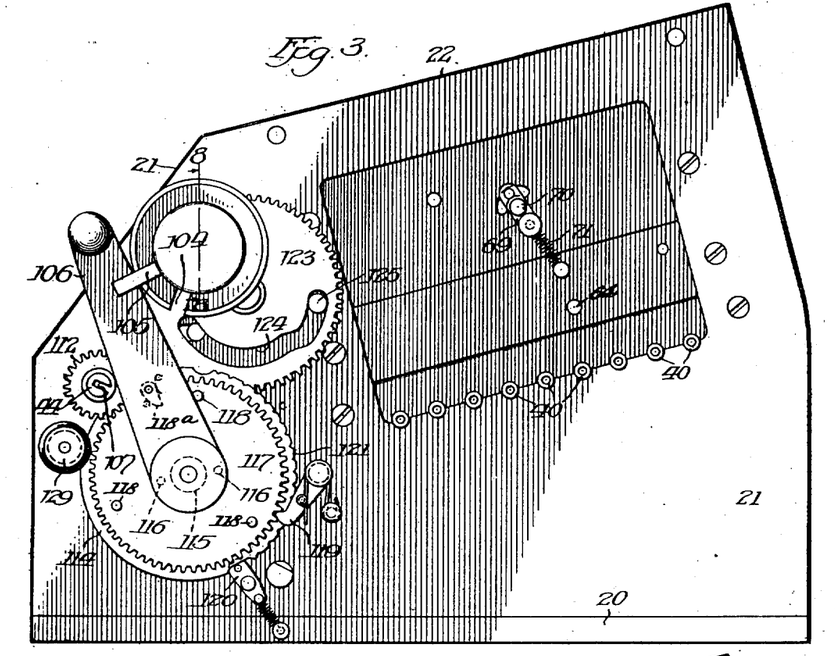
Fig. 3 is an end elevation.

As a means for positively and rigidly holding and guiding the cam wheel 114 we may provide the grooved wheel 129, best shown in Figs. 1 and 3.

As a means for locking the shaft 44 against possibility of movement when not in position for cancellation, we provide, as best shown in Fig. 10, the sliding catch 130 having the lug 131 projecting therefrom, this lug, in the position of Fig. 10, occupying a recess in the bushing 132 which is fixed to the frame. On the actuation of the bar 108 to the left the lug 131 is moved out of engagement with the bushing and the shaft may rotate as required.

It will be seen upon reference to Figs. 4 and 6 that the gear 123 is provided with an aperture 133 registering, when the parts are in operating position, with the opening in the shaft 72. It follows therefore that the gear prevents the insertion of the key except when the parts are in proper position.

Obviously the construction shown is capable of application to many situations different from that shown herein, many of the features of novelty being useful in connection with computing machines generally. We therefore, do not wish to be limited to the adaptation here shown, nor to the specific details herein described.

We claim:

1. In an adding machine, the combination of accumulator mechanisms, and cancellation mechanism, Geneva gears normally engaging said accumulator mechanisms, means for disengaging said gears from said mechanisms during cancellation, means for locking said gears immediately prior to and during the removal of said gears from engagement, and means for resiliently locking said accumulator mechanisms on the disengagement of said gears.

2. In an adding machine, the combination of accumulator mechanisms, and cancellation mechanism, Geneva gears normally engaging said accumulator mechanisms, means for disengaging said gears from said mechanisms during cancellation, means for locking said gears immediately prior to and during the removal of said gears from engagement, means for locking said accumulator mechanisms on the disengagement of said gears, and means for positively locking said accumulator mechanisms against overthrow during cancellation.

3. In an adding machine, the combination of accumulator mechanisms, and cancellation mechanism, Geneva gears normally engaging said accumulator mechanisms, means for disengaging said gears from said mechanisms during cancellation, means for locking said gears immediately prior to and during the removal of said gears from engagement, means for locking said accumulator mechanisms on the disengagement of said gears, and a removable key adapted to actuate all of said means.

4. In an adding machine, the combination of accumulator mechanisms, and cancellation mechanism, Geneva gears normally engaging said accumulator mechanisms, means for disengaging said gears from said mechanisms during cancellation, means for locking said gears immediately prior to and during the removal of said gears from engagement, means for locking said accumulator mechanisms on the disengagement of said gears, and a removable key adapted to actuate all of said means, said key being mounted for manual operation independently of the cancellation mechanism.

5. In an adding machine, the combination of accumulator mechanisms, cancellation mechanism, a shaft carrying Geneva gears, said gears engaging said mechanisms, means for moving said shaft and gears into and out of engagement with said mechanism, means for locking said gears immediately prior to and during the disengagement of the gears from the mechanism, said moving and locking means including a member having cam grooves, and a removable key for actuating said member.

6. In an adding machine, the combination of accumulator mechanisms including number wheels, a cancellation mechanism, a grooved shaft on which said wheels are mounted, catches mounted in said groove and rotatable with said shaft, a bearing for said shaft, said bearing being provided with a notch registering with one of said catches, and means operable by said cancellation mechanism for moving said last mentioned catch into and out of engagement with the notch in said bearing.

7. In an adding machine, the combination of accumulator mechanism, cancellation mechanism, means operable by a removable key for disengaging the number wheels of the accumulator mechanism from their actuating means and for resiliently locking the number wheels, an operating lever for cancellation, said key being so located as to prevent the oscillation of said lever when said key is in place, substantially as described.

8. In an adding machine, the combination of accumulator mechanism including number wheels, cancellation mechanism including an operating lever, a removable key located in the path of movement of said operating lever, said key being connected to disengage the number wheels from their actuating means, a cam operable during the initial movement of the operating lever to connect the same to the number wheels to enable the return of the wheels to zero position, said lever being inoperative prior to the removal of said key, substantially as described.

9. In an adding machine, the combination of number wheels and connections to the same for setting up amounts thereon, means operable by a removable key for disengaging said connections and for simultaneously resiliently holding said number wheels, means carried by the said key for locking the same against removal when the number wheels and connections are in operative position and permitting the removal of the key when said number wheels and connections are disengaged, an oscillatory cancellation lever, said lever and removable key being so disposed that the lever cannot be operated until said key is removed, substantially as described.

In witness whereof we have hereunto signed our names in the presence of two subscribing witnesses.

MAURICE H. MANDELBAUM.
GUSTAVE F. MAISCH.

Witnesses:
CHAS. F. MURRAY,
T. D. BUTLER.

Copies of this patent may be obtained for five cents each, by addressing the "Commissioner of Patents, Washington, D. C."